Feb. 24, 1959   M. HOFFMAN   2,874,815
FRICTION CLUTCH ASSEMBLY
Filed July 23, 1957   2 Sheets-Sheet 1
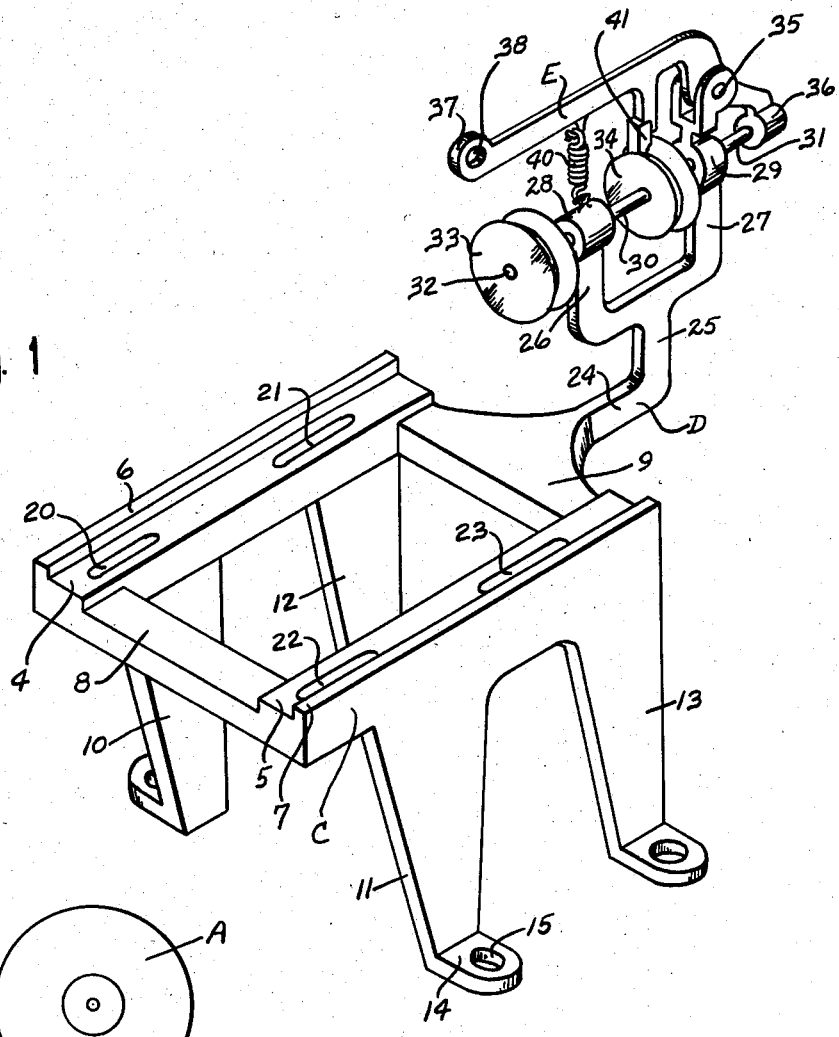
Fig. 1
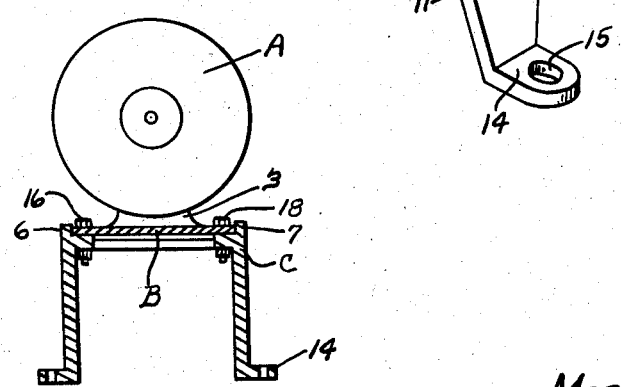
Fig. 4
INVENTOR.
MORRIS HOFFMAN
BY
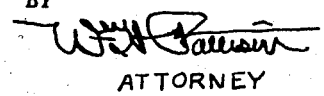
ATTORNEY Feb. 24, 1959     M. HOFFMAN     2,874,815
FRICTION CLUTCH ASSEMBLY
Filed July 23, 1957     2 Sheets-Sheet 2
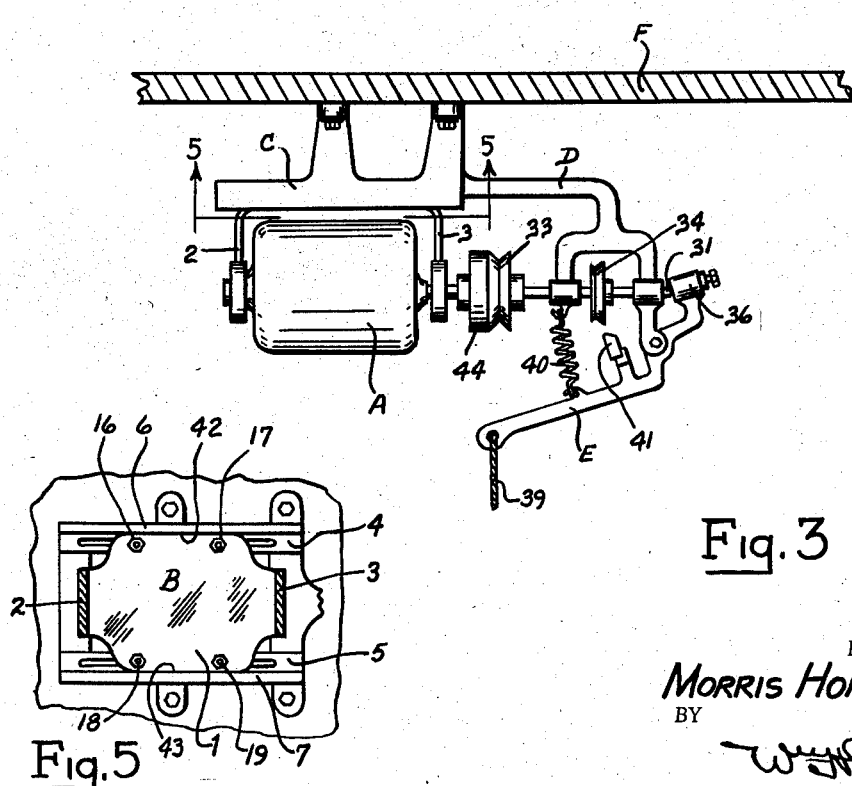
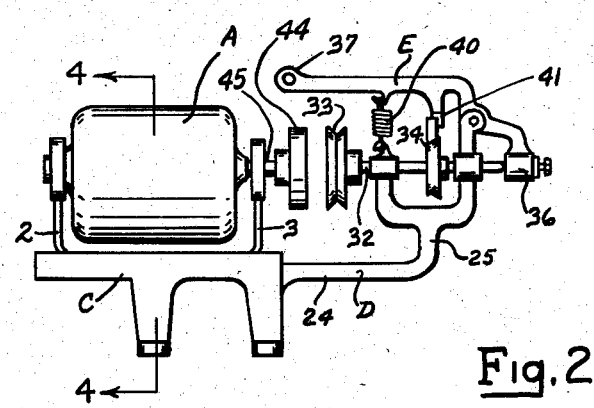
INVENTOR.
MORRIS HOFFMAN
ATTORNEY United States Patent Office 2,874,815
Patented Feb. 24, 1959

2,874,815
FRICTION CLUTCH ASSEMBLY
Morris Hoffman, New York, N. Y.
Application July 23, 1957, Serial No. 673,589
2 Claims. (Cl. 192—66)

This invention relates to a friction clutch assembly and although it has been conceived and designed particularly for use as a drive for sewing machines and will be described as such, it is to be understood that it is not limited to this particular use as it can constitute and be used as a drive for other and different machines or mechanisms.

Friction clutch drives for sewing machines are not new but those heretofore known and in use have been unsatisfactory for numerous reasons. One of the shortcomings of such devices has been that it has been extremely difficult and laborious to align the driving mechanism with the clutch and particularly it has proven practically impossible to maintain alignment between the clutch and the driving motor or mechanism. In an effort to simplify the alignment of the parts the clutch has been made vertically adjustable but this has proven unsatisfactory because of the difficulty in maintaining the adjustment once it has been made. Another shortcoming has been the matter of securing the motor so that it cannot swing or move and by such movement come out of alignment with the clutch.

The primary object of the invention is to provide an assembly in which the drive motor and clutch can be quickly yet rigidly aligned with the clutch.

Further objects and advantages of the assembly is to extend the life of both the motor and the clutch by assuring perfect alignment and thus overcome excessive wear on the bearings of both the motor and the clutch.

A further advantageous result of the invention through a maintained perfect alignment between the motor and the clutch is a quieter and much more efficient operation wherein the full benefit of the horse power of the motor is delivered to the clutch and the elimination of waste power due to strain and stress on the clutch and motor which results from bad or misalignment of the clutch and motor.

A still further object of the invention is to provide an assembly having the enumerated advantages and improvements which is simple of construction and comparatively cheap to produce.

Further objects and advantages of the invention will appear from the following description when read in the light of the accompanying drawings.

In the drawings:

Fig. 1 is a view in perspective elevation of a clutch and the motor supporting bed.

Fig. 2 is a view in side elevation illustrating the motor on the bed, the clutch being shown in non-driving relationship to the motor.

Fig. 3 is a view in side elevation showing the clutch and motor in the position they assume when utilized as a driving means for a sewing machine, the clutch and motor being shown in driving relationship.

Fig. 4 is a vertical sectional view on the line 4—4 of Fig. 1 looking in the direction indicated by arrows.

Fig. 5 is a fragmentary horizontal sectional view on the line 5—5 of Fig. 3 looking in the direction indicated by arrows.

In the drawings A is an electric motor and B, see Figs. 4 and 5, a supporting base therefor. This base comprises a flat base plate 1 from the opposite ends of which are outwardly extending arms 2 and 3 which support the motor. To an understanding of this invention it should be understood that most all frictional horse power motors have bases which are standardized, that is, identical specifications, with the result that the shafts of the motors are supported a predetermined distance above the base plates 1 of the motor supports B. As a consequence of this standardization the present assembly, wherein proper and perfect alignment between the motor and the clutch is automatic, is possible.

Describing the clutch and its integral motor supporting bed, the bed as an entirety is designated as C and comprises a pair of bed plates or faces 4 and 5, which are flat and each of which is provided at its outer longitudinal edge with a flange which is designated 6 and 7. The ends of the bed are interconnected by cross stringers 8 and 9 and at its corners the bed is provided with legs 10, 11, 12 and 13 each of which is provided with a foot such as designated at 14 and each of which is provided with an opening 15 for a bolt or screw. From the construction thus far described it will be seen that the bed actually provides a channelway and it is in this channelway, as will be hereinafter described, that the base plate B of the motor is secured by the means of bolts 16, 17, 18 and 19 which pass through the elongated slots 20, 21, 22 and 23 in the bed plates 4 and 5.

A horn D is formed as an integral part of the bed cross stringer 9 and has an arm 24 extending outwardly and horizontally therefrom and turns upwardly to have a vertical arm 25 which is bifurcated into a pair of arms 26 and 27 each having in its upper end shaft bearings 28 and 29 in which is rotatably and longitudinally slidably supported a shaft 30 having an outwardly extending end 31 remote to the bed and a second outwardly extending end 32 on which is mounted a pulley 33. The shaft intermediate its supporting bearings is provided with a brake pulley or plate 34.

An operating lever E is pivotally mounted intermediate its ends on the horn D as at 35 and is provided with an end 36 adapted to engage the outer end 31 of the clutch shaft and a second end 37 provided with an opening 38 for the reception of a cord or chain 39, see Fig. 3, by which the lever may be operated. A spring 40 normally holds the lever in a position to move the lever end 36 out of engagement with the clutch shaft end 31 and to also engage the brake block 41 with the brake plate or pulley 34. This position of the parts is illustrated in Figs. 1 and 2.

From the construction thus far described it will be seen that the mechanism is rigid and that if the shaft of a motor is properly aligned with the shaft of the clutch and held against movement a perfect alignment will be obtained and maintained. To the accomplishment of this it will be seen that by sliding the motor base B onto the bed channelway this perfect alignment is accomplished and will be maintained. Axial alignment is obtained because the shaft of the motor is supported in the proper plane above the bed to exactly align with the shaft of the clutch. Slewing or swinging of the motor is prevented because the channelway is made of the proper width to snugly receive the motor base. The engagement between the side edges 42 and 43 of the motor base with the flanges 6 and 7 holds the motor against slewing or swinging. In assembling the apparatus the motor is slid on the bed towards the clutch until the drive wheel or friction element 44 carried by the motor shaft 45 is closely adjacent but spaced from the face of the clutch pulley 33. It is intended that this space between these elements be approximately one-sixty fourth of an inch, but for the purpose of better illustration this spacing is exaggerated in Fig. 2 of the drawings. With the motor properly positioned longitudinally of the bed the bolts 16 to 19 inclusive are tightened down.

With this construction it has been found that the highly desirable perfect alignment between the drive motor and the clutch is not only attained but is maintained. Even should the bolts 16 to 19 inclusive loosen due to vibration the motor still cannot swing in the channelway and the most that could happen would be for the motor to move longitudinally away from the clutch. In no event could mis-alignment between the motor and the clutch occur.

It has been explained that the present apparatus is primarily for the purpose of driving a sewing machine and when so used the apparatus is positioned as illustrated in Fig. 3 of the drawings. Here it will be seen that the apparatus is suspended from the underside of a table F or the like on which would be positioned the sewing machine. A belt, not shown, would run from the clutch pulley 33 to the sewing machine for driving the same. When it is desired to drive the sewing machine the cable 39 would be pulled downwardly. The cable could be attached to a foot treadle or any other like mechanism by which the cable can be conveniently operated. When the cable is pulled down the lever E is pulled downwardly against tension of the spring 40. This moves the brake block 41 out of engagement with the brake pulley or plate 34 and simultaneously swings the end 36 of the lever toward the clutch shaft end 31 and slides the shaft through its bearings so as to bring the clutch pulley 33 into engagement with the motor drive element 44.

What I claim is:

1. In a friction drive assembly, a bed having an outer face provided at each of its longitudinal edges with a flange to provide a channelway, a horn integral with the bed and extending outwardly and upwardly from one end thereof, the upper end of the horn being provided with bearings disposed in a plane above and extending precisely parallel to the bed face, a shaft rotatably and longitudinally slidably supported in the horn bearings, a pulley secured to one end of the shaft and having a face disposed precisely at right angles to the bed face, a motor on the bed, the motor having a support comprising a flat base with upwardly extending motor supporting arms, the motor base being of a width to snugly fit between the side flanges of the bed, the motor shaft provided with a drive plate adapted to frictionally engage the face of the clutch pulley, the arms of the motor base supporting the motor shaft in the same horizontal plane with that of the clutch pulley shaft, the flanges of the bed positioning the motor base to exactly axially align the two shafts, means to secure the motor base to the bed with the motor drive plate adjacent but spaced from the face of the clutch pulley, and means to longitudinally slide the clutch pulley shaft to bring the face of the pulley into frictional engagement with the motor drive plate.

2. A device of the character described comprising, a bed having an outer flat face, a horn integral with the bed and extending outwardly and upwardly from one end thereof, a horizontally disposed shaft rotatably mounted in the upper end of the horn and provided with a pulley having a friction face disposed at right angles to the outer face of the bed, a motor on the bed face, the motor provided with a shaft having a drive element having a friction face disposed at right angles to the bed face and adapted to frictionally engage the face of the pulley for driving the same, the bed at each of its longitudinal sides being provided with an upwardly extending flange each being substantially the length of the bed, a pair of spaced apart longitudinally extending slots at each side of the bed and paralleling the flanges in spaced relationship thereto, the motor being provided with a support comprising a flat plate having at its opposite ends an upwardly extending motor supporting arm, the longitudinal edges of said support plate being straight, the plate resting directly upon the upper face of the bed and being of a width to snugly fit between the side flanges of the bed with the straight longitudinal edges of the plate in abutment with the bed flanges to hold the motor against movement in a direction transverse the bed, the support plate being provided with longitudinally extending slots positioned to register with the slots in the bed, and bolts passing through the motor support plate slots and the bed slots and constituting means for adjustably securing the motor longitudinally on the base and holding the motor against longitudinal movement on the base.

References Cited in the file of this patent
UNITED STATES PATENTS

| | | |
|---|---|---|
| 1,886,035 | Mann | Nov. 1, 1932 |
| 2,068,331 | Katzman | Jan. 19, 1937 |
| 2,133,228 | Le Vesconte | Oct. 11, 1938 |
| 2,179,360 | Vasta | Nov. 7, 1939 |
| 2,187,968 | Friedman | Jan. 23, 1940 |
| 2,196,891 | Berndt | Apr. 9, 1940 |
| 2,498,392 | Boyle | Feb. 21, 1950 |